(12) United States Patent
Lesage

(10) Patent No.: US 9,360,149 B2
(45) Date of Patent: Jun. 7, 2016

(54) FLUID CONDUIT DIELECTRIC NIPPLE FOR PUSH-FIT CONNECTOR

(71) Applicant: MICLAU-S.R.I. INC., Montreal-East (CA)

(72) Inventor: Jean-Claude Lesage, Kirkland (CA)

(73) Assignee: MICLAU S.R.I. INC.

( * ) Notice: Subject to any disclaimer, the term of this patent is extended or adjusted under 35 U.S.C. 154(b) by 114 days.

(21) Appl. No.: 14/121,177

(22) Filed: Aug. 11, 2014

(65) Prior Publication Data

US 2016/0040811 A1    Feb. 11, 2016

(51) Int. Cl.
*F16L 9/14*       (2006.01)
*F16L 58/18*      (2006.01)
*F24H 1/00*       (2006.01)
*F16L 25/02*      (2006.01)

(52) U.S. Cl.
CPC .............. *F16L 58/188* (2013.01); *F16L 25/028* (2013.01); *F24H 1/00* (2013.01)

(58) Field of Classification Search
CPC ......... F16L 15/00; F16L 21/00; F16L 37/086; F16L 37/0841; F16L 37/088; F16L 25/021; F16L 25/028; F16L 58/02; F16L 58/182; F16L 37/0985; F16L 25/091; F16L 58/188; F16L 37/091

See application file for complete search history.

(56) References Cited

U.S. PATENT DOCUMENTS

| | | | | | |
|---|---|---|---|---|---|
| 2,257,385 | A * | 9/1941 | Keegan | .................... | F24H 1/186 122/13.01 |
| 2,806,718 | A * | 9/1957 | Cook | .................. | F16L 58/1027 138/145 |
| 3,093,161 | A * | 6/1963 | Jacobson | ................. | F16L 58/02 138/143 |
| 3,753,888 | A * | 8/1973 | Alewitz | ................... | C23F 13/02 204/196.16 |
| 3,893,719 | A * | 7/1975 | Eidelberg | .............. | F16L 41/007 174/651 |
| 4,225,162 | A * | 9/1980 | Dola | ........................ | F16L 25/01 174/665 |
| 4,345,785 | A * | 8/1982 | Bradford | ............... | F16L 25/021 285/288.5 |
| 4,817,997 | A * | 4/1989 | Ingram | ............... | F16L 33/2076 285/256 |
| 4,929,001 | A * | 5/1990 | Phillips, II | ................ | F16L 5/12 285/141.1 |
| 4,991,876 | A * | 2/1991 | Mulvey | .................... | E03C 1/025 285/21.1 |
| 5,213,378 | A * | 5/1993 | MacGregor | ........... | F16L 41/082 285/141.1 |
| 5,378,870 | A * | 1/1995 | Krupnicki | .............. | B23K 9/323 219/136 |
| 5,520,221 | A * | 5/1996 | Meier | ................... | B29C 63/346 138/109 |
| 5,931,200 | A * | 8/1999 | Mulvey | ............... | F16L 19/0212 138/109 |
| 6,102,442 | A * | 8/2000 | Gretz | ..................... | H02G 3/083 285/251 |
| 6,129,121 | A * | 10/2000 | Kohle | ..................... | F16L 25/021 138/140 |
| 6,386,596 | B1 * | 5/2002 | Olson | ................. | F16L 37/0925 285/305 |
| 6,616,192 | B1 * | 9/2003 | Zoboli | .................... | F16L 25/02 285/47 |
| 6,957,831 | B1 * | 10/2005 | Lesage | .................... | F16L 41/14 220/567.3 |
| 7,017,251 | B1 * | 3/2006 | Murphy | .................. | C23F 13/18 204/196.17 |
| 7,048,561 | B1 * | 5/2006 | Elbaz | ..................... | H02G 3/088 174/652 |
| 2004/0090064 | A1 * | 5/2004 | Rowley | ................... | F16L 33/30 285/256 |
| 2007/0034634 | A1 * | 2/2007 | Brown | ..................... | A45F 3/16 220/703 |
| 2011/0067173 | A1 * | 3/2011 | Fasola | ...................... | E03D 1/14 4/415 |

* cited by examiner

*Primary Examiner* — Beth Stephan
(74) *Attorney, Agent, or Firm* — Houle Patent Agency Inc.

(57) ABSTRACT

A fluid conduit dielectric nipple for securement to a tank wall of a fluid holding tank, such as a steel tank of a water heater is described. The fluid conduit dielectric nipple has a tank securement end and a cylindrical conduit connecting end specifically configured for receiving a push-fit quick connector to secure to a water supply line and a hot water return line. The fluid conduit dielectric nipple is fabricated from inexpensive metal, such as plated steel, and has a plastics liner to protect parts thereof intended to be exposed to water to prevent corrosion while providing a leak-proof connection. Accordingly, there is provided an inexpensive dielectric nipple which provides quick connection and disconnection.

8 Claims, 2 Drawing Sheets

FLUID CONDUIT DIELECTRIC NIPPLE FOR PUSH-FIT CONNECTOR

TECHNICAL FIELD

The present invention relates to a fluid conduit dielectric nipple and particularly, but not exclusively, for use with a tank of a water heater whereby to connect water lines thereto to admit and retract water from the tank.

BACKGROUND OF THE INVENTION

Currently nipples are used to provide connection of fluid pipes or conduits to tanks, particularly steel tanks to admit and remove all sorts of fluids thereto. One type of nipple used on water holding tanks consists in a short metal tube, such as a brass tube, having an outer thread at opposed ends whereby to connect to a threaded bore formed in the tank and at the opposite end to receive a threaded connector secured to a water line. The installation of such nipple and connectors is somewhat time consuming and care has to be taken to ensure that leaks do not occur. Also, brass fittings are expensive although they resist corrosion, which is an important feature when fitted to a water tank where it is exposed to water. There is thus a need to provide such fluid conduit nipple which is less expensive and easy and quickly connectable to water conduits.

SUMMARY OF THE INVENTION

It is therefore a feature of the present invention to provide a fluid conduit dielectric nipple for securement to a tank wall which is economical to manufacture and which is quick-connectable to water conduit lines.

Another feature of the present invention is to provide a fluid conduit dielectric nipple having a connecting end adapted for quick connection to a quick-connector.

Another feature of the present invention is to provide a fluid conduit dielectric nipple formed from steel material and wherein parts thereof exposable to water are lined with a plastic material and provided with a cylindrical conduit connecting end adapted for quick securement to a push-fit connector.

According to the above mentioned features, from a broad aspect, the present invention provides a fluid conduit dielectric nipple for securement to a tank wall. The fluid conduit dielectric nipple is comprised of a metallic tubular member having a through bore. A plastics material liner is secured to the surface of the through bore and extends end-to-end thereof. The metallic tubular member has a tank connecting end and an opposed cylindrical conduit connecting end. The cylindrical conduit connecting end has a predetermined length and is provided with a circumferential groove thereabout which is disposed a predetermined distance from a free end of the cylindrical conduit connecting end. The cylindrical conduit connecting end is adapted to receive a quick-connector to engage with the groove to secure a fluid conduit to the cylindrical conduit connecting end in a leak-proof condition.

According to a further broad aspect of the present invention the quick-connector is a push-fit connector generally of a type known by the registered trademark "SharkBite" or a similar push-fit connector.

According to a still further broad aspect of the present invention, the fluid conduit dielectric nipple is fabricated from steel which is an inexpensive metal as opposed to brass.

BRIEF DESCRIPTION OF THE DRAWINGS

A preferred embodiment of the present invention will now be described with reference to the accompanying drawings in which.

DETAILED DESCRIPTION

Figure 2:
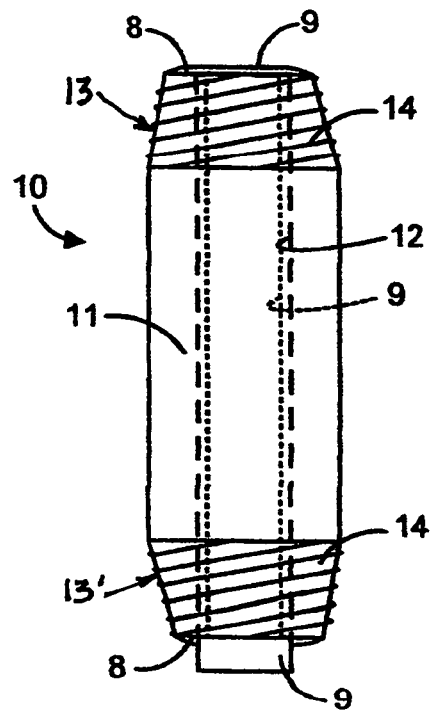
FIG. 2 is a side view of a prior art fluid conduit dielectric nipple which is adapted for securement to a tank wall of a water heater.

Referring now to the drawings, and more particularly to FIG. 2, there is shown at 10 a fluid conduit dielectric nipple of the prior art for securement to a water tank wall. Such nipples 10 are usually constructed from brass or other metals resistant to corrosion due to their exposure to water. As herein illustrated the fluid conduit dielectric nipple 10 is a tubular member 11 having a through bore 12. The inner surface of the through bore 12 is lined with a plastic material 9 to protect against corrosion. The plastic material extends over the opposed circumferential edges 8 of the tubular member 11. Opposed ends 13 and 13' of the tubular member may be slightly conically shaped, although herein exaggerated, and provided with an outer threaded wall 14 for connection to the tank wall (in the case of an NPT thread) and to a water line connector. The tubular member 11 may also have straight opposed threaded ends.

With reference now to FIGS. 1 and 3 to 5, there is shown generally at 15 the fluid conduit dielectric nipple of the present invention and which is adapted to connect to a quick push-fit type connector 16 which will be described herein below. The fluid conduit nipple 15 is comprised of a metallic tubular member 17, herein a plated steel member, having a through bore 18. The through bore 18 is lined with a plastics material shield 19 for protection against corrosion and it extends from end-to-end, as better seen in FIGS. 5A and 5B. The plastics shield is injection molded onto the tubular member.

The tubular member 17 has a tank connecting end 20 and an opposed cylindrical conduit connecting end 21. The cylindrical conduit connecting end 21 has a predetermined length and provided with a circumferential groove 22 there about and also disposed a predetermined distance from a free end 23 of the cylindrical conduit connecting end 20 for securement to a push-fit connector 16. The length of the cylindrical conduit connecting end 21 and its diameter as well as the position of the groove is precise to provide a leak proof connection with a push-fit connector such as the type commonly know by the registered trademark "SHARKBITE" or any other similar connector.

Figure 1:
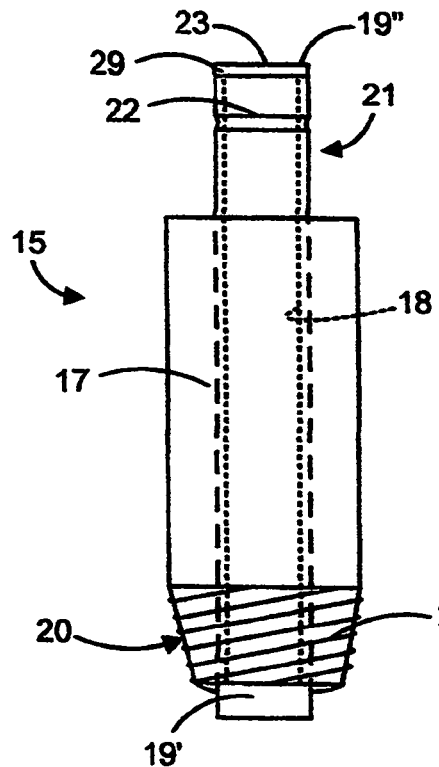
FIG. 1 is a side view of the fluid conduit dielectric nipple of the present invention for securement to a steel wall of a tank.
Figure 5A:
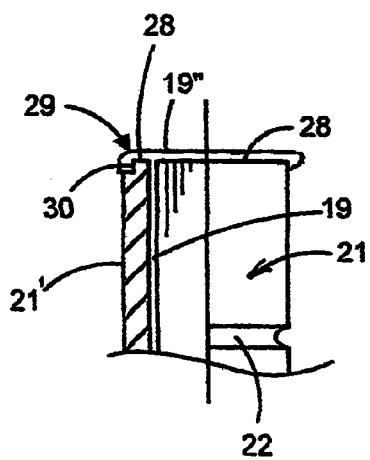
FIG. 5A is a sectional end view of the cylindrical conduit connecting end showing the plastics material liner and the seal outer end feature thereof.
Figure 5B:
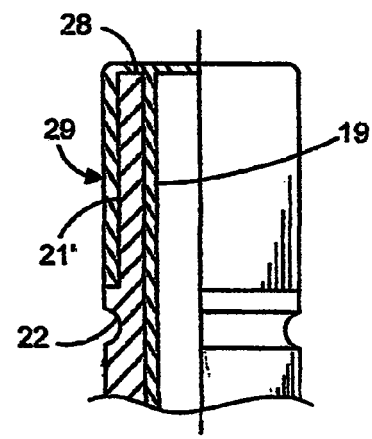
FIG. 5B is a further sectional end view showing a further modification of the cylindrical conduit connecting end.

As shown in FIG. 1, the plastics liner material has a stub extension 19' projecting from the connecting end 20 and projects inside the tank wall 24 of a hot water tank which is glass lined and is the only part of the nipple which is exposed to the water therein. The connecting end 20 herein illustrated is a conically tapered end having threads 25 formed therein for threaded connection to a threaded bore of a connecting spud 26 welded to the tank wall 24. The tank wall 24 has a glass-lined inner surface 27. At the opposed end of the fluid conduit nipple 15, herein the top end of the cylindrical conduit connecting end 21, the plastics liner extend over the outer end edge 28 thereof as illustrated in FIG. 5A, to form a permanent plastic ring seal 29. The outer end edge 28 also has an outer circumferential recessed ledge 30 formed thereabout to provide for the plastics seal 29 to extend over the edge 28 to isolate an outer end portion of the cylindrical conduit connecting end which is adapted to be received in the push-fit connector 16. As shown in FIG. 5B, the plastic seal 29 may extend over the outer surface 21' to terminate close to the groove 22 to protect against corrosion due to water infiltration in the push-fit connector.

Figure 4:
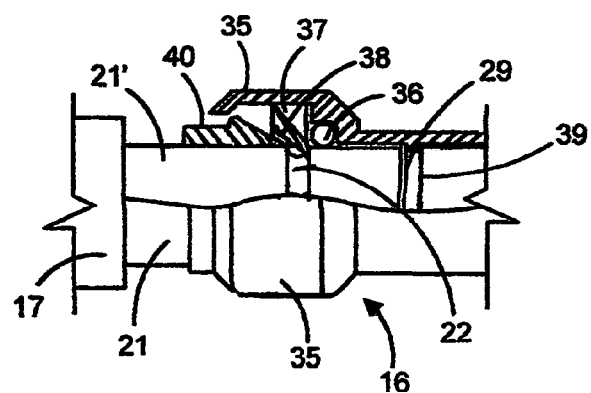
FIG. 4 is a fragmented side view showing the cylindrical conduit connecting end of the fluid conduit dielectric nipple of the present invention connected to a push-fit connector.

As shown in FIG. 4, the cylindrical conduit connecting end 21 is shown secured in the push-fit connector 16. The push-fit connector 16 is a tubular connector provided with a protection cylindrical flange wall 35 under which is housed an o-ring seal 36 and a grab ring 37. The grab ring 37 has teeth 38 retained spaced-apart thereabout that open out and frictionally slide under a biasing force onto the outer surface 21' of the cylindrical conduit connecting end 21 when pushed into the opening under the circumferential flange wall 35. The teeth flex and grab into the groove 22 of the cylindrical conduit connecting end 21 with its plastic end seal 29 at its free end 23 abutting against a circumferential stop ring 39. A release collar 40 is provided to release the teeth from engagement with the groove 22 to disconnect from the cylindrical conduit connecting end 21 of nipple 15.

Figure 3:
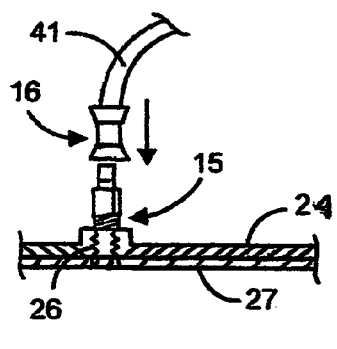
FIG. 3 is a schematic illustration showing a quick connector secured to a water conduit and to the fluid conduit dielectric nipple of the present invention which is herein shown secured to a tank wall.

It can be appreciated from the design of the above described fluid conduit dielectric nipple 15 of the present invention that the nipple is economical to fabricate due to its use of steel and a plastic liner to seal parts thereof subject to exposure to water. Further, the nipple 15 of the present invention has a cylindrical conduit connecting end 21 configured to receive a quick push-fit connector 16 of suitable type wherein to considerably reduce assembly time of water intake and water return conduits to the tank of a water heater. One such water line conduit 41 is illustrated in FIG. 3.

It is within the ambit of the present invention to provide any obvious modifications thereof provided such modifications fall within the scope of the appended claims.

The invention claimed is:

1. A fluid conduit dielelectric nipple for securement to a tank wall, said fluid conduit dielectric nipple comprising a metallic tubular member having a through bore defining an inner surface, a plastics material liner secured to said inner surface of said through bore and extending end-to-end thereof, said metallic tubular member having a tank connecting end and an opposed cylindrical conduit connecting end, said plastics material liner extending over an outer end edge of said cylindrical conduit connecting end, said outer end edge having an outer circumferential recessed ledge, said plastics material liner extending over said recessed ledge to completely isolate an outer end portion of said cylindrical conduit connecting end, said cylindrical conduit connecting end having a predetermined length and provided with a circumferential transverse groove thereabout and disposed a predetermined distance from a free end of said cylindrical conduit connecting end whereby to receive a push fit quick-connector having a grab ring with flexible gripping teeth to engage with said groove to secure a fluid conduit to said cylindrical conduit connecting end in a leak-proof condition.

2. The fluid conduit dielectric nipple as claimed in claim 1, wherein said plastics material liner has a stub extension portion projecting from said tank connecting end.

3. The fluid conduit dielectric nipple as claimed in claim 2, wherein said tank connecting end is constituted by an outer threaded outer end adapted for securement in a threaded hole formed in a spud connector secured to a tank wall with said stub extension portion of said plastics material liner for extending to an inner surface of said tank wall.

4. The fluid conduit dielectric nipple as claimed in claim 3, wherein said tank wall is a water containing tank of a water heater and having a glass-lined inner surface.

5. The fluid conduit dielectric nipple as claimed in claim 1, wherein said metallic tubular member is a steel tubular member.

6. The fluid conduit dielectric nipple as claimed in claim 5, wherein said plastics material liner provides a shield for portions of said steel tubular member exposed to water to prevent rust corrosion from forming on said portions exposed to water.

7. The fluid dielectric nipple as claimed in claim 1, wherein said cylindrical conduit connecting end is provided with one or more of said circumferential groove with said one or more circumferential groove being spaced from one another in parallel relationship.

8. The fluid conduit nipple as claimed in claim 4, wherein said tank is that of a water heater and has an inner glass lined coating.

\* \* \* \* \*